United States Patent
Abe

(10) Patent No.: US 8,156,856 B2
(45) Date of Patent: Apr. 17, 2012

(54) HYDRAULIC CYLINDER

(75) Inventor: Yoshiyuki Abe, Nihonmatsu (JP)

(73) Assignee: NOK Corporation, Tokyo (JP)

( * ) Notice: Subject to any disclaimer, the term of this patent is extended or adjusted under 35 U.S.C. 154(b) by 644 days.

(21) Appl. No.: 12/349,736

(22) Filed: Jan. 7, 2009

(65) Prior Publication Data
US 2010/0170390 A1 Jul. 8, 2010

(51) Int. Cl.
*F16J 10/02* (2006.01)
(52) U.S. Cl. ............... 92/169.1; 92/162 R; 92/170.1
(58) Field of Classification Search .......... 92/162 R, 92/165 R, 168, 169.1, 170.1; 91/417 R, 417 A
See application file for complete search history.

(56) References Cited

U.S. PATENT DOCUMENTS 3,544,118 A * 12/1970 Klein ................ 92/162 R

FOREIGN PATENT DOCUMENTS

| JP | 9-411 | 7/1997 |
| JP | 2004-028160 | 1/2004 |

* cited by examiner

*Primary Examiner* — Michael Leslie
(74) *Attorney, Agent, or Firm* — Harness, Dickey & Pierce, P.L.C.

(57) ABSTRACT

A hydraulic cylinder includes a cylinder having a shaft hole, a piston inserted into the shaft hole so as to have clearance with respect to an inner circumferential surface of the shaft hole, and seal members arranged in annular grooves formed in an inner circumference of the shaft hole to seal an annular gap between the inner circumference of the shaft hole and the piston, wherein in the hydraulic cylinder in which cavitation could occur in a portion of the clearance accompanying motion of the piston, an expansion part obtained by expanding a portion of a sidewall surface of the annular grooves on an inner circumferential edge side outward from an arrangement area of the seal members is provided to make a distance from a location where cavitation occurs to the seal members longer by a space formed by the expansion part.

5 Claims, 4 Drawing Sheets

HYDRAULIC CYLINDER

BACKGROUND OF THE INVENTION

1. Field of the Invention

The present invention relates to a hydraulic cylinder.

2. Description of the Related Art

A hydraulic cylinder is generally provided with a seal member for sealing an annular gap between a piston and a cylinder FIG. 5 is a schematic sectional view showing a sealing system provided with a hydraulic cylinder according to a conventional example.

The sealing system according to a conventional example shown in FIG. 5 seals an annular gap between two members (a piston 400 and a cylinder 500 in the illustrated example) that relatively perform reciprocating motion. The sealing system includes three seal members arranged in the order of a buffer ring 100, a rod seal 200, and a dust seal 300 from the side (O) on which oil is sealed toward the atmosphere side (A). The buffer ring 100 principally carries out a function to buffer pressure (hydraulic pressure) of oil to be sealed, the rod seal 200 principally carries out a function to prevent leakage of oil, and the dust seal 300 principally carries out a function to prevent intrusion of dust from outside.

In a hydraulic cylinder provided with a sealing system as described above, the piston 400 is inserted so as to have minute clearance S with respect to an inner circumferential surface of a shaft hole provided in the cylinder 500 and each seal member (the buffer ring 100, the rod seal 200 and the dust seal 300) is arranged in each annular groove provided on the inner circumferential surface of the shaft hole.

Here, in a hydraulic cylinder in which a piston and a cylinder relatively perform reciprocating motion at high speed like, for example, a breaker and which is used in an environment in which hydraulic pressure rises, cavitation occurs when oil enters clearance from an annular groove where a seal member is arranged. In the sealing system shown in FIG. 5, cavitation could occur in portions (three locations) denoted by X.

When such cavitation occurs, very high pressure is instantaneously created in the vicinity of the cavitation that occurs due, for example, to a cavitation shock wave originating from a burst of bubbles. Accordingly, there is a problem that losses of seal lips of the seal members occur scattered near the tips thereof and thus, sealing performance deteriorates. Though seal members are assumed to be replaced in a timely fashion as a consumable item in a sealing system used in a very severe environment like a breaker, endurance life of seal members is demanded to be made longer.

BRIEF SUMMARY OF THE INVENTION

An object of the present invention is to provide a hydraulic cylinder that attempts to improve endurance thereof by suppressing or preventing deterioration of seal members originating from cavitation.

The present invention adopts means below to solve the above problem.

That is, a hydraulic cylinder of the present invention includes a cylinder having a shaft hole;

a piston inserted into the shaft hole so as to have clearance with respect to an inner circumferential surface of the shaft hole; and seal members arranged in annular grooves formed in an inner circumference of the shaft hole to seal an annular gap between the inner circumference of the shaft hole and the piston, wherein in the hydraulic cylinder in which cavitation could occur in a portion of the clearance accompanying motion of the cylinder, an expansion part obtained by expanding a portion of a sidewall surface of the annular grooves on an inner circumferential edge side outward from an arrangement area of the seal members is provided to make a distance from a location where cavitation occurs to the seal members longer by a space formed by the expansion part.

According to the present invention, the distance from the location where cavitation occurs to the seal members is made longer by a space formed by the expansion part and thus, deterioration of the seal members originating from cavitation can be suppressed.

According to the present invention, as described above, deterioration of the seal members originating from cavitation can be suppressed or prevented and thus, endurance thereof can be improved.

DETAILED DESCRIPTION OF THE INVENTION

A preferred embodiment for carrying out the present invention will exemplarily be described below based on the embodiment with reference drawings. If not specifically mentioned, dimensions, materials, and shapes of components described in the embodiment and relative configurations thereof do not limit the scope of the present invention to these.

Embodiment

A hydraulic cylinder according to the embodiment of the present invention will be described with reference to FIGS. 1 to 4

<Hydraulic Cylinder>

Figure 1:
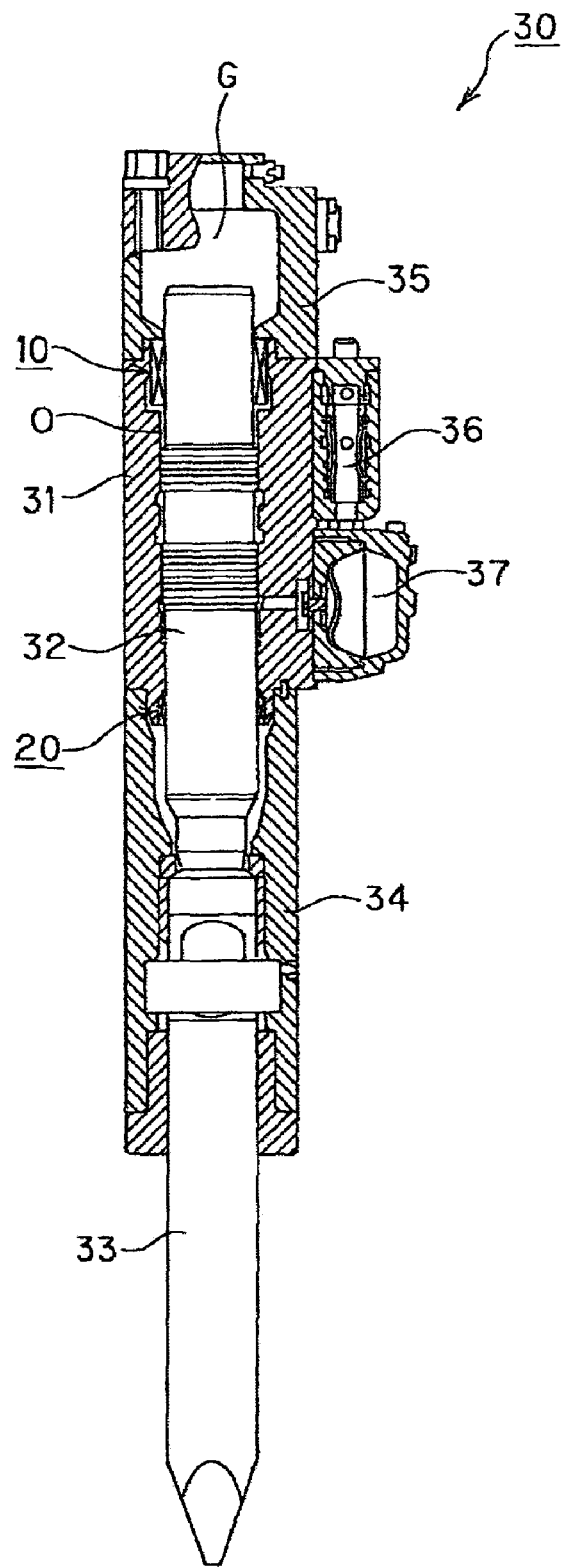
FIG. 1 is a schematic sectional view of a breaker to which a hydraulic cylinder according to an embodiment of the present invention is applied.

The configuration of a hydraulic cylinder according to the embodiment of the present invention will be described with reference to FIG. 1. Here, a case in which a hydraulic cylinder is applied to a breaker is taken as an example. FIG. 1 is a schematic sectional view of a breaker to which a hydraulic cylinder according to the embodiment of the present invention is applied.

A breaker 30 includes a cylinder 31 in a cylindrical shape having a shaft hole and a piston 32 inserted into the shaft hole of the cylinder 31 so as to have clearance with respect to an inner circumferential surface of the shaft hole. A chisel (rod) 33 for pulverizing concrete or base rock is provided at the tip of the piston 32

Then, a front head 34 in a cylindrical shape is coaxially fixed on a front side of the cylinder 31. The chisel 33 is freely reciprocatingly provided inside the front head 34 and a thrust ring or thrust bush for receiving an impact from the chisel 33 is incorporated into the front head 34. A back head 35 in a closed-end cylindrical shape is coaxially fixed on a back-end side of the cylinder 31. An output port of hydraulic pressure and a suction valve of gas are incorporated in the back head 35 and the back head 35 is filled with a nitrogen gas G.

The breaker 30 also includes a control valve 36 for controlling reciprocation movement of the piston 32 and an accumulator 37 filled with a high-pressure nitrogen gas to compensate for pressure and prevent pulsation of a hydraulic circuit in the cylinder 31.

Then, the breaker 30 is provided with a first sealing system 10 and a second sealing system 20 on the back-end side and on the front side respectively to seal an annular gap between the shaft hole of the cylinder 31 and the piston 32. In FIG. 1, the first sealing system 10 and the second sealing system 20 are shown in a simplified manner. Then, oil O is sealed between the first sealing system 10 and the second sealing system 20. The first sealing system 10 has a role to prevent leakage of the oil O and also to prevent leakage of the nitrogen gas G. The second sealing system 20 has a role to prevent leakage of the oil O and also to prevent intrusion of dust from outside.

In the breaker 30 configured as described above, a destruction target (such as concrete and base rock) is pulverized by reciprocating the chisel 33 in a pile shape in the axial direction at high speed together with the piston 32 through hydraulic pressure and gas pressure to cause the tip of the chisel 33 to strike against the destruction target. By compressing a gas through hydraulic pressure and using repulsion of the gas, the piston 32 and the chisel 33 can be moved toward the destruction target at high speed (for example, 10 m/s).

<First Sealing System>

Figure 2:
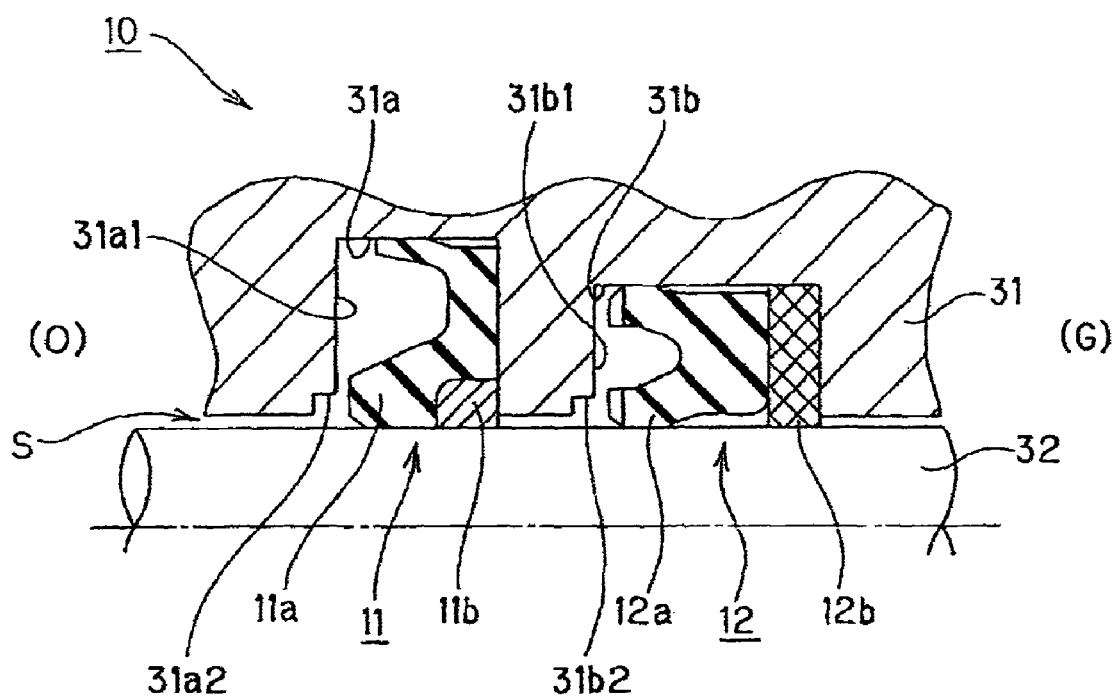
FIG. 2 is a schematic sectional view of a first sealing system according to the embodiment of the present invention.

The first sealing system 10 will further be described in detail particularly with reference to FIG. 2. FIG. 2 is a schematic sectional view of a first sealing system according to the embodiment of the present invention. The first sealing system 10 includes a buffer ring 11 and a rod seal 12. The buffer ring 11 includes a seal body 11a whose cross section has a substantial U shape and a backup ring 11b to prevent extrusion of an inner circumferential edge of the seal body 11a on the lower-pressure side (gas side G) to the clearance S. Similarly, the rod seal 12 includes a seal body 12a whose cross section has a substantial U shape and a backup ring 12b to prevent extrusion of an inner circumferential edge of the seal body 12a on the lower-pressure side to the clearance S.

The buffer ring 11 principally carries out a function to buffer pressure (hydraulic pressure) of oil to be sealed and the rod seal 12 principally carries out a function to prevent leakage of oil. Then, with the first sealing system 10 including the buffer ring 11 and the rod seal 12, oil leakage to the side (G) on which a nitrogen gas is filled is prevented and also, leakage of a nitrogen gas to the side (O) on which oil is sealed is prevented.

The buffer ring 11 and the rod seal 12 are arranged in annular grooves 31a and 31b formed in the inner circumference of the shaft hole provided in the cylinder 31 respectively. Here, a notch 31a2 in an annular groove shape is provided near the inner circumferential edge of a sidewall surface 31a1 on the side (O) on which oil is sealed in the annular groove 31a in which the buffer ring 11 is arranged. With the notch 31a2, a portion of the sidewall surface 31a1 on the inner circumferential edge side expands outward from the arrangement area of the buffer ring 11 (expansion part). In the annular groove 31b in which the rod seal 12 is arranged, a notch 31b2 in the annular groove shape is similarly provided near the inner circumferential edge of a sidewall surface 31b1 on the side (O) on which oil is sealed. With the notch 31b2, a portion of the sidewall surface 31b1 on the inner circumferential edge side expands outward from the arrangement area of the rod seal 12 (expansion part).

<Second Sealing System>

Figure 3:
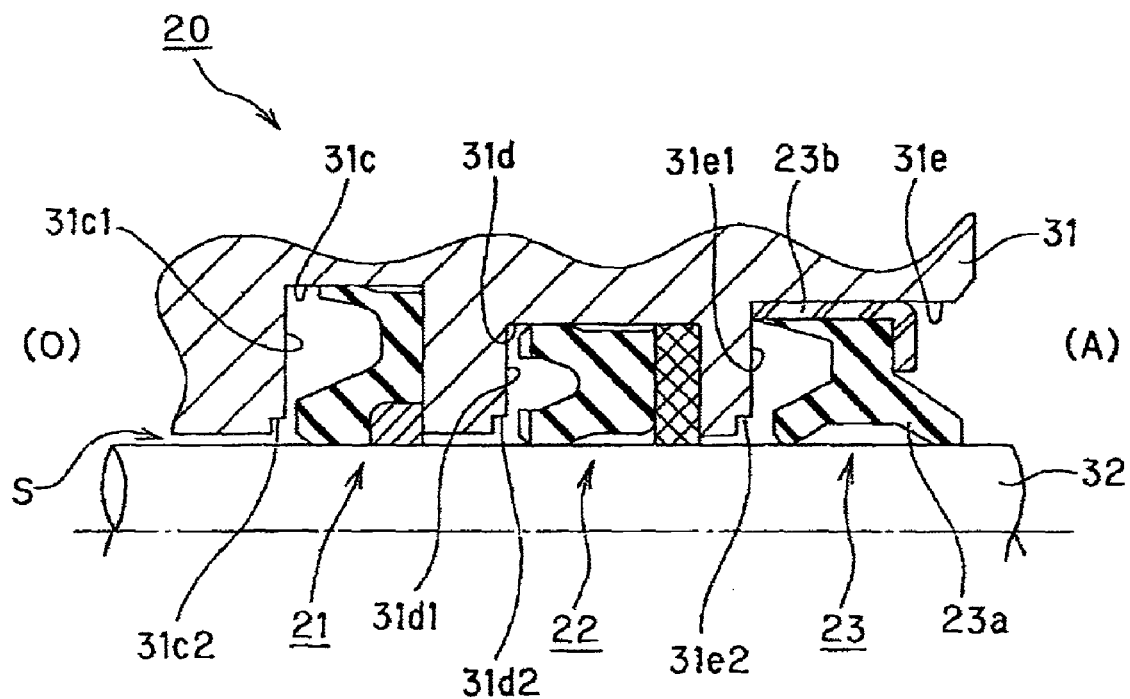
FIG. 3 is a schematic sectional view of a second sealing system according to the embodiment of the present invention.

The second sealing system 20 will further be described in detail particularly with reference to FIG. 3. FIG. 3 is a schematic sectional view of a second sealing system according to the embodiment of the present invention. The second sealing system 20 includes a buffer ring 21, a rod seal 22, and a dust seal 23. The buffer ring 21 and the rod seal 22 have basically the same configurations and functions as those in the first sealing system described above and thus, a description thereof is omitted.

The dust seal 23 includes a reinforcement ring 23b and a seal body 23a integrally including an oil lip and a dust lip. The dust seal 23 principally carries out a function to prevent intrusion of dust from outside.

With the second sealing system 20 including the buffer ring 21, the rod seal 22, and the dust seal 23, oil leakage to an outer side (A) is prevented and also, intrusion of dust into the side (O) on which oil is sealed is prevented.

The buffer ring 21, the rod seal 22, and the dust seal 23 are arranged in annular grooves 31c, 31d, and 31e formed in the inner circumference of the shaft hole provided in the cylinder 31 respectively. Here, a notch 31c2 in the annular groove shape is provided near the inner circumferential edge of a sidewall surface 31c1 on the side (O) on which oil is sealed in the annular groove 31c in which the buffer ring 21 is arranged. With the notch 31c2, a portion of the sidewall surface 31c1 on the inner circumferential edge side expands outward from the arrangement area of the buffering 21 (expansion part). In the annular groove 31d in which the rod seal 22 is arranged, a notch 31d2 in the annular groove shape is similarly provided near the inner circumferential edge of a sidewall surface 31d1 on the side (O) on which oil is sealed. With the notch 31d2, a portion of the sidewall surface 31d1 on the inner circumferential edge side expands outward from the arrangement area of the rod seal 22 (expansion part). In the annular groove 31e in which the dust seal 23 is arranged, a notch 31e2 in the annular groove shape is similarly provided near the inner circumferential edge of a sidewall surface 31e1 on the side (O) on which oil is sealed. With the notch 31e2, a portion of the sidewall surface 31e1 on the inner circumferential edge side expands outward from the arrangement area of the dust seal 23 (expansion part).

Advantages of the Present Embodiment

Figure 4:
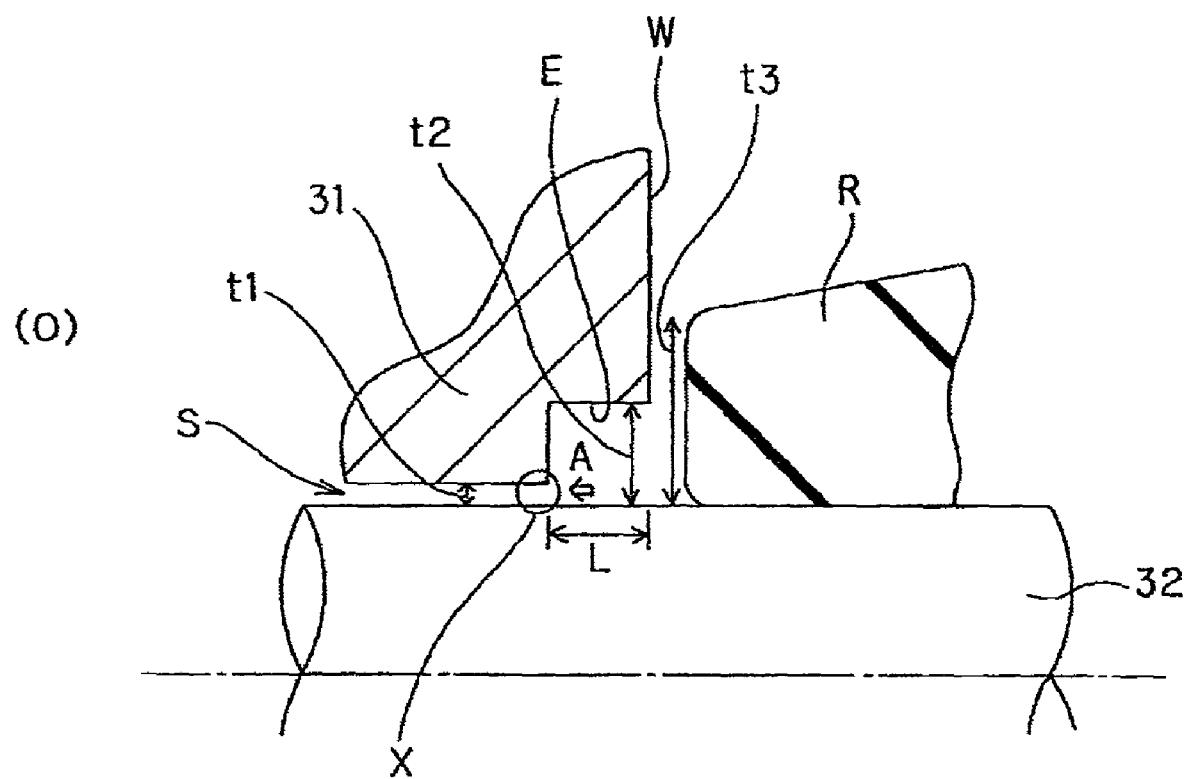
FIG. 4 is a schematic sectional view showing how an area near where cavitation occurs looks like in the hydraulic cylinder according to the embodiment of the present invention.
Figure 5:
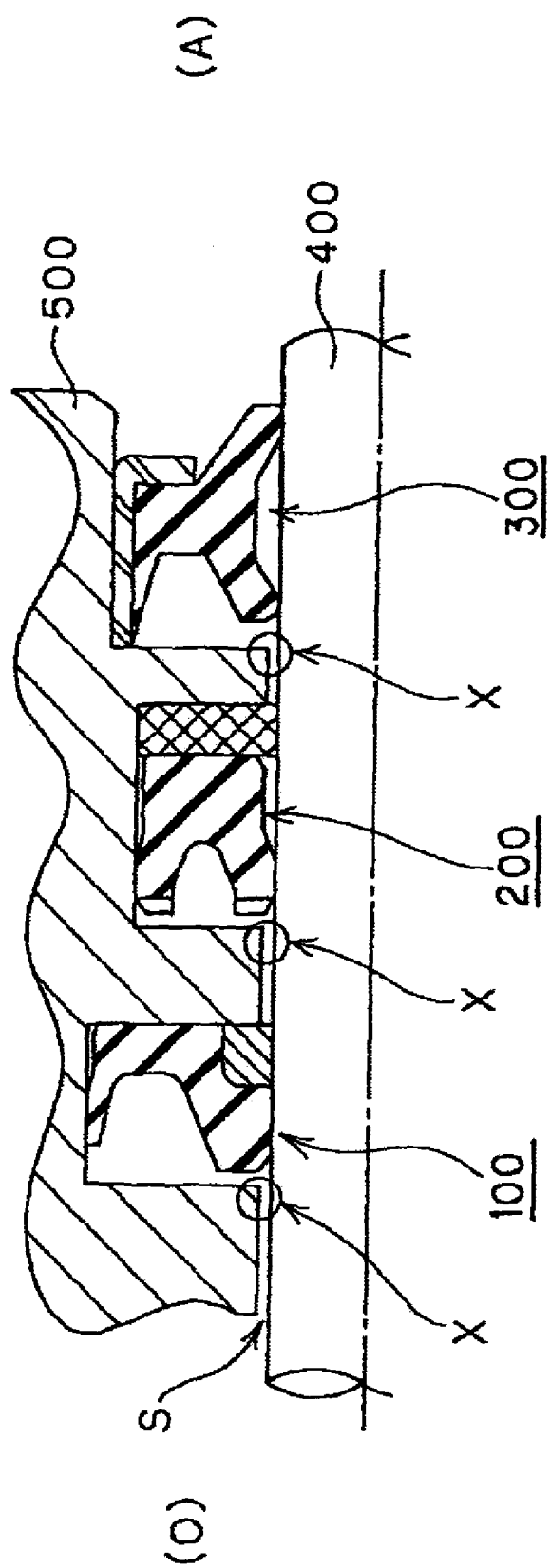
FIG. 5 is a schematic sectional view showing a sealing system provided with a hydraulic cylinder according to a conventional example.

Advantages of a hydraulic cylinder according to the present embodiment will be described particularly with reference to FIG. 4. FIG. 4 is a schematic sectional view showing how an area near where cavitation occurs looks like in the hydraulic cylinder according to the embodiment of the present invention. The structure near a lip tip (near an area where cavitation occurs) of each seal member (buffer ring, rod seal and dust seal) described above is approximately the same and FIG. 4 shows such a structure schematically.

In FIG. 4, R shows a lip tip and corresponds to a seal lip tip in the buffer ring 11/21 on the inner circumference side, a seal lip tip in the rod seal 12/22 on the inner circumference side, and an oil lip tip in the dust seal 23. Alphabet W in FIG. 4 shows a sidewall surface on the side (O) on which oil is sealed in the annular groove in which each seal member is arranged and corresponds to the sidewall surfaces 31a1, 31b1, 31c1, 31d1, and 31e1. Alphabet E in FIG. 4 shows a notch provided near the inner circumferential edge of a sidewall surface and corresponds to the notches 31a2, 31b2, 31c2, 31d2, and 31e2.

In the present embodiment, the distance from the location (denoted by alphabet X in FIG. 4) where cavitation occurs to the seal members (particularly, the lip tip susceptible to cavitation) is made longer by a space (alphabet L in FIG. 4 in the axial direction) formed by the notch E provided near the inner circumferential edge of the side wall surface w. Accordingly, deterioration of the seal members (particularly, the lip tip) originating from cavitation can be suppressed or prevented.

Here, dimensions of the notch E will further be described in detail. In the present embodiment, if the clearance between the shaft hole of the cylinder 31 and the piston 32 is t1, the distance between the inner circumferential surface of the notch E in the annular groove shape and the outer circumferential surface of the piston 32 is t2, and the thickness of the tip part of the lip tip R is t3, the hydraulic cylinder is designed so as to satisfy t1<t2<t3.

First, a reason for setting t1<t2 will be described. Cavitation occurs at a location where the velocity of flow becomes very fast, because pressure of a fluid (oil) locally drops below saturation pressure of the fluid temperature. That is, in a hydraulic cylinder, the velocity of flow becomes very fast when oil moving together with the piston (oil near the surface of the piston) enters a portion of clearance between the shaft hole of the cylinder and the piston from a portion of the annular groove in which a seal member is arranged and then, cavitation occurs at a location concerned.

An object of providing the notch E in the present embodiment is, as described above, to keep the location where cavitation occurs away from the lip tip R. Thus, it is useless to provide the notch E if cavitation occurs at a location where the notch E is provided, which necessarily leads to t1<t2. Incidentally, it is necessary not only to make t2 greater than t1, but also to make t2 so great that no cavitation occurs in a condition of use of a breaker 30. Accordingly, as shown in FIG. 4, when oil near the surface of the piston flows in an arrow A direction together with the piston, cavitation occurs at a location (X) where the clearance S is entered. Therefore, the distance between the location (X) where cavitation occurs and the lip tip R can be made longer by L.

Next, a reason for setting t2<t3 will be described. Pressure is higher on the side (O) on which oil is sealed than on the opposite side (the side (G) on which a nitrogen gas is filled or the outer side (A)) at a location where a sealing system is provided and thus, as shown in FIG. 2 or FIG. 3, a buffer ring or rod seal is positioned on the side (G) on which a nitrogen gas is filled or the outer side (A) in an annular groove. However, due to some influence, the buffer ring or rod seal may move to the side (O) on which oil is sealed. Thus, setting t2<t3 needs to be set so that the lip tip R should not penetrate in to the notch E. Incidentally, for the dust seal 23 shown in FIG. 3, there is no possibility that the dust seal 23 moves due to fluid pressure because the reinforcement ring 23b is firmly fixed to the inner circumferential surface of the annular groove by press fitting. Therefore, no problem is presented if t2<t3 is not set.

The length L of the notch E in the axial direction will be described. The increasing length L is more desirable because the distance from the location where cavitation occurs to the seal members can be made longer with the increasing length L in the axial direction. Thus, the length L is preferably made as long as possible within a range in which strength of wall portions between annular grooves in which each seal member is arranged is maintained properly in accordance with the size and material of the cylinder.

However, while generated pressure accompanying an occurrence of cavitation is very high, energy thereof is not large and thus, the range affected by cavitation is an immediate vicinity of the occurrence location of cavitation. Therefore, even if the length L cannot be made much longer, it is expected that deterioration of seal members originating from cavitation is efficiently suppressed.

<Others>

In the embodiment described above, notches whose cross section is rectangular (in the annular groove shape) as expansion parts are shown. However, the shape of the expansion part (notch) is not limited to the above shapes. For example, an expansion part whose cross section is triangular or substantially triangular may be provided by chamfering a C surface (taper surface) or R surface at an inner circumferential edge on the sidewall surface of an annular groove.

What is claimed is:

1. A hydraulic cylinder, comprising:
 a cylinder having a shaft hole;
 a piston inserted into the shaft hole so as to have clearance with respect to an inner circumferential surface of the shaft hole; and
 seal members arranged in annular grooves formed in an inner circumference of the shaft hole to seal an annular gap between the inner circumference of the shaft hole and the piston, wherein
 in the hydraulic cylinder in which cavitation could occur in a portion of the clearance accompanying motion of the piston, an expansion part obtained by expanding a portion of a sidewall surface of the annular grooves on an inner circumferential edge side outward from an arrangement area of the seal members is provided to make a distance from a location where cavitation occurs to the seal members longer by a space formed by the expansion part, wherein the expansion part is immediately adjacent to and extending directly from the annular grooves.

2. The hydraulic cylinder according to claim 1, wherein the seal members include a buffer ring and a rod seal, each including a seal lip facing said expansion part.

3. The hydraulic cylinder according to claim 2, wherein the seal members further include a dust seal.

4. The hydraulic cylinder according to claim 2, wherein the expansion part is on an oil side of the annular grooves.

5. The hydraulic cylinder according to claim 4, further comprising a backup ring on a gas side of the annular grooves.

* * * * *